May 28, 1968

T. F. SARAH 3,385,536

LATCH MECHANISM FOR THE LINE PICKUP
DEVICES IN SPINNING REELS

Filed Aug. 24, 1965

INVENTOR.
THOMAS F. SARAH
BY Hamilton & Cook
ATTORNEYS

May 28, 1968  T. F. SARAH  3,385,536
LATCH MECHANISM FOR THE LINE PICKUP
DEVICES IN SPINNING REELS
Filed Aug. 24, 1965  3 Sheets-Sheet 2

INVENTOR.
THOMAS F. SARAH
BY Hamilton & Cook
ATTORNEYS

3,385,536
LATCH MECHANISM FOR THE LINE PICKUP
DEVICES IN SPINNING REELS

Thomas F. Sarah, Akron, Ohio, assignor to Pflueger Corporation, Akron, Ohio, a corporation of Ohio
Filed Aug. 24, 1965, Ser. No. 482,090
3 Claims. (Cl. 242—84.2)

ABSTRACT OF THE DISCLOSURE

A latch for the actuating mechanism of a line pickup device in a spinning type fishing reel. The latch mechanism is operable between two relatively rotatable members and has a lock pawl with one end secured to the first of the relatively rotatable members. The other end of the pawl forms a sear which is biasingly urged against the second of the relatively rotatable members for selective engagement within a lock groove therein. A recess extends radially of the lock groove, the groove and recess forming a rim which is engageable, upon rotation of the relatively rotatable members, by a radially oriented, axially extending lip carried on the pawl in proximity to the sear to disengage the pawl from the groove and recess.

---

The present invention relates generally to fishing reels of the spinning type. More particularly, the present invention relates to fishing reels having a normally nonrotatable spool and a radially enclosed rotatable flyer from which a line pickup device is radially extensible to wind the line onto the spool and retractable to permit the line to uncoil off the spool. Specifically, the present invention relates to the latch mechanism by which the pickup device is retained in retracted position and selectively released.

The spinning reel with its normally nonrotatable spool from which the line uncoils during the cast has achieved widespread acceptance, particularly because it eliminates backlash which so frequently occurs with the type of reel in which the spool rotates to pay out the line during the cast.

Moreover, the spinning reel has garnered even more advocates because it is as readily usable on a casting rod, fly rod or specialized spinning rod.

Generally, all spinning reels may be classified according to three characteristics. They are open faced or closed face, finger snubbed or mechanically snubbed, and undermounted or overmounted.

The open faced or closed face characteristic refers to the exposure of the spool. The closed reels are usually provided with a cover cap, or the like, which encompasses the spool and permits exit of the line through an eyelet. Such a construction is advantageous in that the coils peeling off of the spool are confined within the cover cap so that the line reaches the first line guide on the fishing rod traveling in almost a straight line and therefore is little or no opportunity for the line to tangle itself about the line guide on the rod. However, so confining the coils does add to the frictional resistance against the line as it pays out. In open faced reel constructions there is either no cover cap at all or the cover cap has an eyelet of relatively large diameter and the coils peeling off of the spool during the cast are not confined within the reel, thus reducing friction at the reel. However, the line is often still in a partial coil as it reaches the first guide line on the rod and the first guide line must therefore be of increased diameter to reduce friction. With open faced reels it is found necessary to provide at least the first line guide with sloping protectors extending from the rod to the outermost portion of the guide to prevent the line from coilingly encircling the guide and binding thereon.

Overmounted and undermounted refers to the position in which the reel is mounted with respect to the rod. When a fisherman is standing with his fishing rod in his casting hand and the tip of the rod is pointed forwardly away from him, if the reel is on the top, or upper side, of the rod, he is using an overmounted reel. If the reel is underneath, or on the lower side, of the rod, he is using an undermounted reel.

The finger snubbed reel requires that the fisherman use one or more fingers to engage, or snub, the line both to control the release and flight of the line. Most early spinning reel constructions embodied this concept. However, these constructions generally required the fisherman to use two hands in preparing the reel for the cast. To facilitate the ease of operation, constructions were developed wherein the line was mechanically snubbed by pinching the line between two elements. Such constructions were operative by one hand, but the pinching of the line both to prevent the line from paying off the spool until the desired time in the casting procedure and to snub the line at the desired time after the cast to control the flight subjected the line to serious abrading.

In my copending U.S. application Ser. No. 482,174, filed Aug. 24, 1965, now U.S. Patent No. 3,327,962, a mechanism is disclosed whereby the line is snubbed preparatory to the cast, released for the cast and selectively snubbed after the cast for controlling the flight by a mechanism actuated solely by the fingers of the casting hand and without pinching, or otherwise abrading, the line. As indicated in my aforesaid U.S. Patent No. 3,327,-962, a latch mechanism was required but no particular latch construction was critical thereto.

It is therefore the primary object of the present invention to provide a latch mechanism whereby the line pickup device is retained in retracted position and released, as desired.

It is another object of the present invention to provide a latch mechanism, as above, which may be utilized in a spinning reel having an axially reciprocal as well as an axially fixed line spool.

It is a further object of the present invention to povide a latch mechanism, as above, which is as readily adaptable to a line pinching snubber as well as a nonpinching line snubber.

It is an even further object of the present invention to provide a latch mechanism, as above, which is relatively uncomplicated and economical to produce.

These and other objects of the invention, as well as the advantages thereof over existing and prior art forms, will be apparent in view of the following detailed description of the attached drawings and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Figure 1:
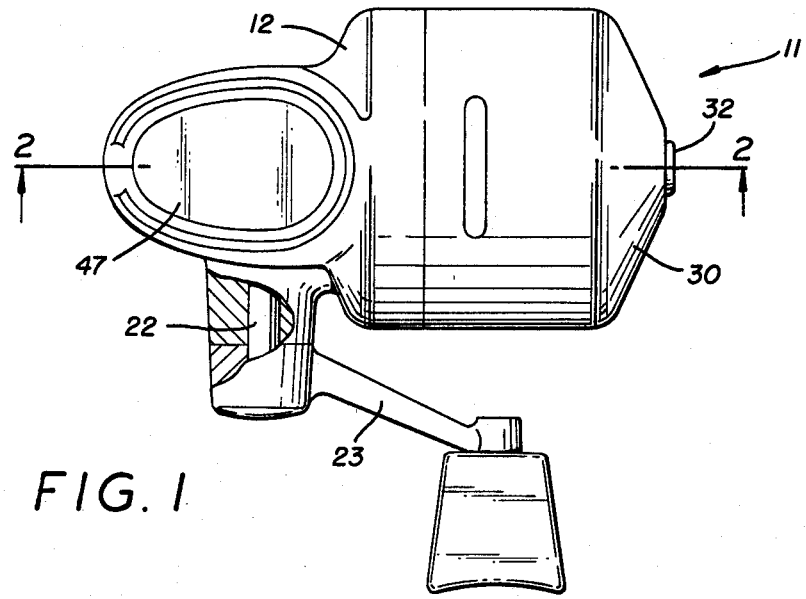
FIG. 1 is a top plan view of a spinning reel embodying the concept of the present invention.

In general, a reel constructed according to the concept of the present invention has a normally nonrotatable spool carried within the reel housing with a rotatable enclosed flyer mounted adjacent the outer, or line access, side of the spool. The flyer is comprised of a cup-shaped carrier, a holder and a pickup device rotatable to pick up and coil the line onto the spool during the line retrieving operation.

The holder is mounted on the carrier to be slidable from a radially inner to a radially outer position. A spring means biases the holder to the outer position where it causes the pickup device to extend radially outwardly of the carrier. A mechanism is also provided which is operative from exteriorly of the housing to slide the holder from the outer to the inner position for retracting the pickup device.

A latch mechanism retains the holder in the inner position and selectively releases the holder. The present latch mechanism utilizes a lock pawl operative between the relatively rotatable holder and housing. One end of the pawl is anchored to one of the relatively rotatable members and the other end forms a sear biased against the other of the relatively rotatable members. A lock groove in the member against which the sear abuts receives the sear when the holder is in the radially inner position to lock it there. The rim of a recess extending radially of and forming a part of the lock groove cooperates, upon rotation of the carrier, with a lip extending axially of the lock pawl in proximity to the sear to release the pawl from the lock groove so that the holder may be biased to its radially outer position.

Referring more particularly to the drawings, the improved latch mechanism, indicated generally by the numeral 10, is operatively mounted in a spinning reel 11.

The reel housing 12 is divided by an integral partition wall 13 into a gear compartment 14 and a spool compartment 15. A cover plate, not shown, on the side of the rear, preferably flattened, portion of the housing containing the gear compartment 14 provides access thereto.

Fixed to and extending forwardly of the partition wall 13 is a tubular bearing 16. Interiorly of the bearing 16 a drive shaft 18 is mounted for rotation. Exteriorly of the bearing 16 a line spool 19 is supported. The line spool is generally nonrotatable but may be selectively rotatable against the action of the drag mechanism, not shown, or may also be axially slidable in conjunction with a level wind mechanism, also not shown.

The rear portion of the drive shaft extends through the partition wall 13 into the gear compartment 14 and mounts a bevel pinion 20 thereon. A bevel drive gear 21 meshes with pinion 20 and is mounted on a shaft 22 for rotation by the crank handle 23. The usual brake means and antireversing pawls may also be used, but since they form no part of the present invention and are not necessary to an environmental understanding of the present invention, they have not been depicted.

A flyer, indicated generally by the numeral 24, is fixedly mounted on the forward end of the drive shaft 18 for rotation therewith. Specifically, the base 25 of the cup-shaped carrier 26 is swaged, or otherwise suitably attached, to the drive shaft 18. The skirt 28 of the carrier 26 extends rearwardly over the front flange 29 of the spool 19.

A cap 30 is attached to the housing 12 to complete the spool compartment 15. The cap 30 may be attached to the housing in a number of ways. For example, it may be screwed onto the annular flange 31, as shown. The forward portion of the cap 30 is provided with a line guide, or eyelet, 32. The purpose of the eyelet 32, when utilizing a line pickup device as taught in my aforesaid U.S. Patent No. 3,327,962, is merely to guide the line inwardly and outwardly of the spool compartment 15 and may, with such a construction, be of any diameter depending upon whether one desires an open faced or a closed face construction. However, the subject latch mechanism 10 may also be utilized with a reel employing elements which pinch the line for snubbing, and in such a construction a smaller diameter eyelet is often utilized.

The above-described structure is well known to the art and forms no part of the present invention, the description being set forth merely to provide an environmental understanding.

The unique holder 33 and pickup device 34 do not form a part of the present invention, being completely disclosed in my U.S. Patent No. 3,327,962, but will be briefly described herein for further environmental understanding of the subject latch mechanism 10.

Figure 2:
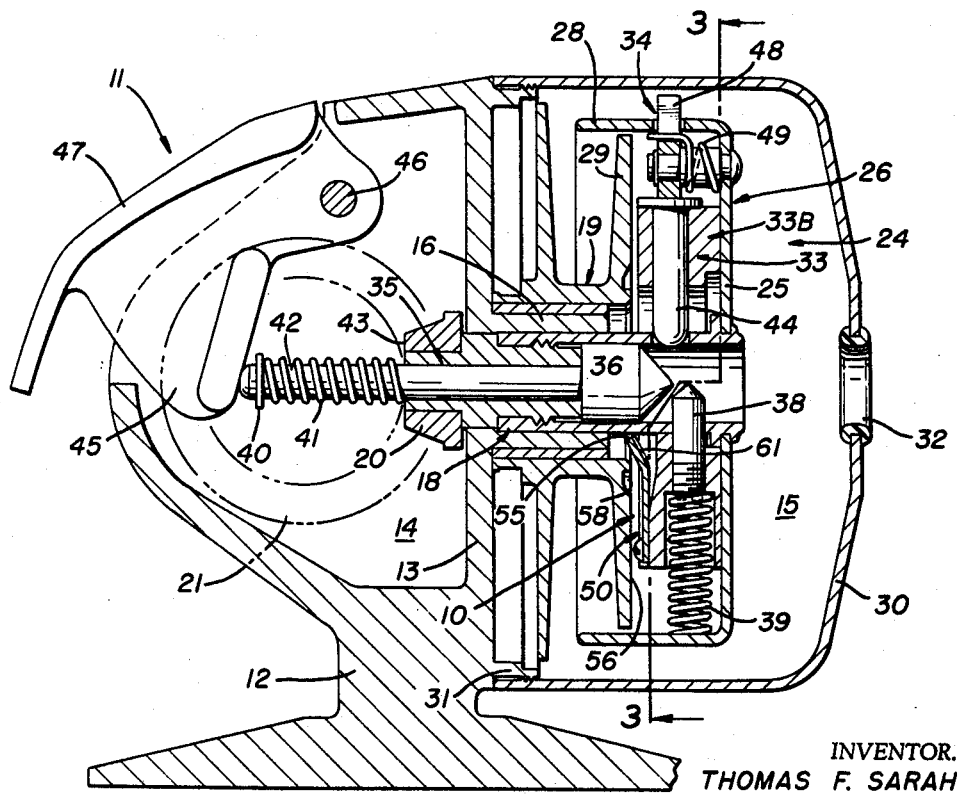
FIG. 2 is an enlarged cross section taken substantially on line 2—2 of FIG. 1 depicting the pickup device extended and the latch mechanism disengaged.
Figure 3:
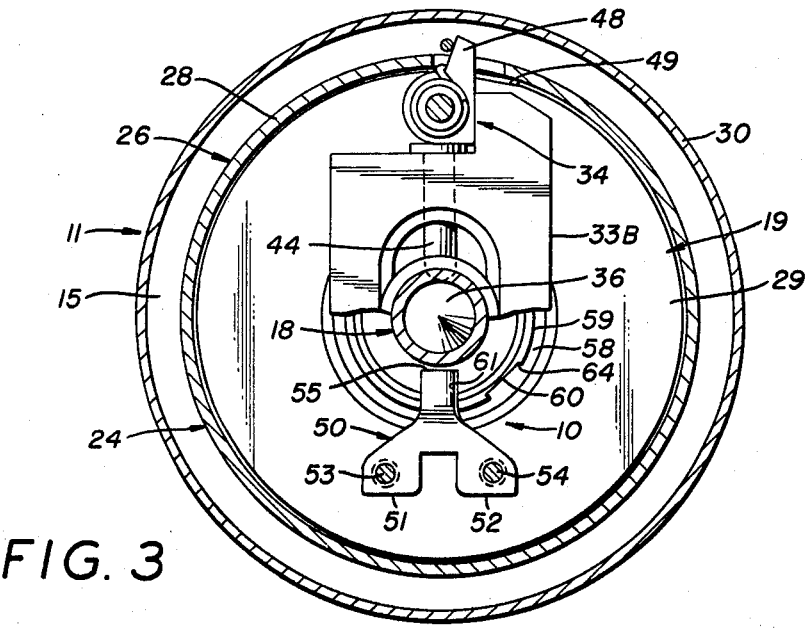
FIG. 3 is a cross section taken substantially on line 3—3 of FIG. 2.
Figure 4:
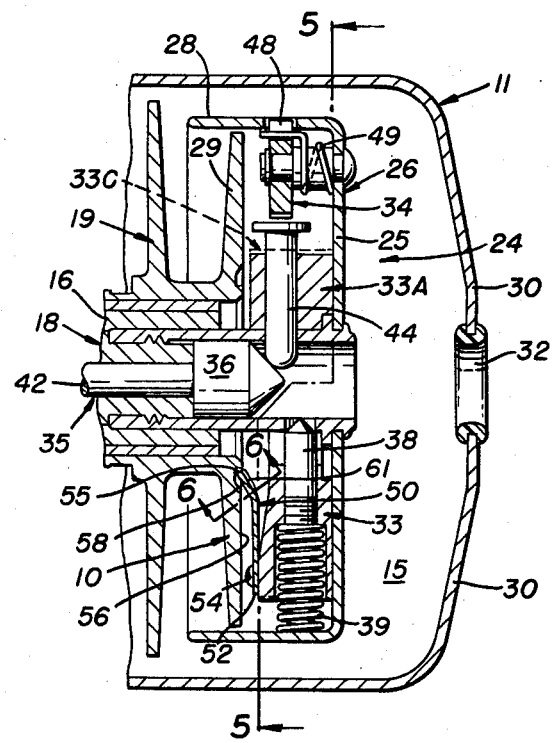
FIG. 4 is a fragmentary area of FIG. 2 depicting the holder in the radially inner position with the pickup device retracted.

The holder 33 is slidably mounted on the base 25 of carrier 26 between a radially inner position 33A, as depicted in FIG. 4, and a radially outer position 33B, depicted in FIG. 2.

A plunger 35 is axially slidably received through drive shaft 18 with a plunger head 36 on the forwardmost end which engages a tumbler pin 38 when the plunger 35 is moved forwardly, to slide the holder from the outer position 33B to the inner position 33A. The latch mechanism 10 carried on the holder 33 retains the holder in the radially inner position 33A against the biasing action of spring 39.

The rearmost end of plunger 35 has a radially extending cap portion 40 and a compression spring 41 which encircles the plunger rod 42 and extends between the rearmost face 43 of the bevel pinion 20 and the cap portion 40 biasingly to urge the plunger 35 rearwardly out of contact with the tumbler pin 38 and the lifter rod 44.

A lever arm 45 is rockably mounted on a stud shaft 46 in the gear compartment 14 so as to be actuated by a push button 47 mounted to be operative from the exterior of the housing 12. The control means comprising the push button 47 and the lever arm 45 operate to move the plunger 35 forwardly against the biasing action of spring 41.

As the plunger 35 moves forwardly the head 36 engages the lifter rod 44 to maintain the pickup head 48 extended outwardly of the carrier 26 and sequentially engages the tumbler pin 38 to slide the holder to the inner position 33A where it is locked by the latch mechanism 10. The pickup head 48 remains extended until the plunger 35 is released, at which time the spring 49 biases the pickup head 48 to the retracted position depicted in FIG. 4. Subsequent forward movement of the plunger 35 will again extend the pickup head 48 outwardly of the carrier 26 to snub the line during the cast for controlling the flight thereon. If a further explanation of the unique holder 33 and pickup device 34 is desired, reference may be had to the aforesaid U.S. Patent No. 3,327,962.

Turning now to the latch mechanism 10, a lock pawl 50 is depicted as being attached, by ears 51 and 52 to the holder 33. The ears 51 and 52 on the one end of the lock pawl 50 form an anchor means through which cap screws 53 and 54 fixedly secure that end of the pawl 50 to the holder 33.

The other end of the lock pawl 50 forms a sear 55 which is biased away from the holder 33 toward an abutting wall 56. As shown, the abutting wall 56 is the forward face of the flange 29 on the axially fixed spool 19. With the spool axially fixed the forward end of bearing 16 may be slightly recessed so that when the holder is in the outer position 33B, the means biasing the sear 55 away from the holder 33 will be relieved, as shown in FIG. 2. This biasing means may comprise a separate spring, not shown, or it may be that the lock pawl 50 is itself a flat spring, as shown.

However, should the spool 19 be of the axially reciprocating variety, as is depicted in my copending U.S. application Ser. No. 482,130, filed Aug. 24, 1965, now U.S. Patent No. 3,327,963, the forwardmost end of the bearing 16 could be radially flared to form the abutting wall itself. In any event, the abutting wall 56 is axially fixed with respect to the housing 12.

An annular lock groove 58 is provided in the abutting wall 56 concentrically of the drive shaft 18 and radially inwardly of the anchor means (51 and 52) on the pawl 50. However, the lock groove 58 is positioned radially outwardly of the shaft 18 sufficiently so that the holder is in the inner position 33A when the sear 55 of the pawl 50 is received in the lock groove 58. The engagement of the sear 55 against the radially inner wall 59 of groove 58 maintains the holder in the inner position 33A (FIG. 4).

Figure 5:
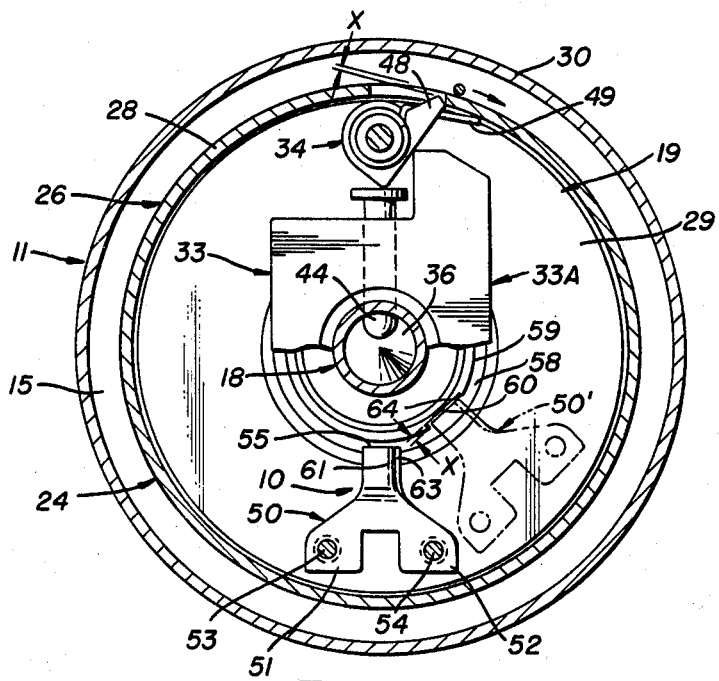
FIG. 5 is a cross section taken substantially on line 5—5 of FIG. 4.

A recess 60 extends radially inwardly of the groove 58 along a portion of the periphery of the inner wall 59 thereof. This recess 60 is of sufficient peripheral dimension that as the carrier 26 is rotated to align the sear 55 with the recess 60 the spring 39 will bias the holder 33 to an intermediate position 33C, as shown in chain line in FIG. 4 and as represented by the phantom position 50' of the pawl in FIG. 5. In this intermediate position, 33C and 50', the sear 55 has moved radially toward the shaft 18 and is received completely within the recess 60. At this point it should be noted that the pickup device 34 must remain retracted when the holder is in the intermediate position 33C so that in the event that the recess 60 and the sear 55 are aligned when the holder is moved from the outer position 33B toward the inner position 33A, the pickup head 48 will be retracted, upon release of push button 47, to permit the line to uncoil off the spool 19. For this reason, the pickup head 48 is shown to be retracted within the carrier skirt 28 a radial distance X when the holder is in the inner position 33A (FIG. 5), and this radial distance X is equal to the radial dimension of the recess 60.

Figure 6:
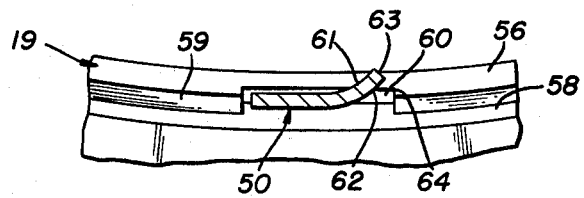
FIG. 6 is an enlarged cross section taken substantially on line 6—6 of FIG. 4; and, FIG. 7 is an enlarged perspective of the lock pawl used in the subject latch mechanism.
Figure 7:
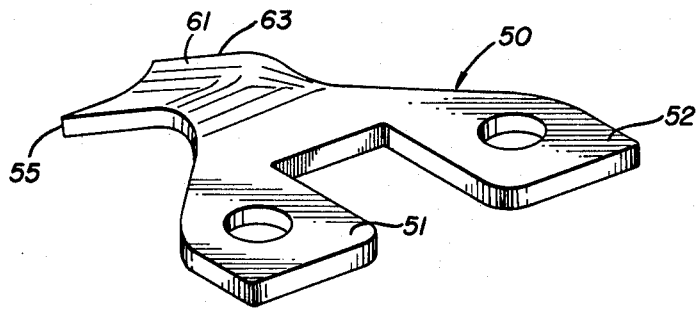

As is best seen in FIGS. 6 and 7, a radially oriented, axially extending lip 61 is formed on the lock pawl 50 in proximity to the sear 55. The underside 62 of the leading edge 63 of lip 61 extends axially outwardly of the rim 64 of the recess 60 so that continued rotation of the carrier 26 allows the cooperative action between the rim 64 and that portion of the pawl 50 engaging thereagainst to cause the pawl 50 to disengage from the groove 58 and recess 60 so that the spring 39 can bias the holder to the radially outer position 33B and extend the pickup head 48.

It should thus be apparent that a spinning reel latch mechanism constructed according to the concept of the present invention is not only uncomplicated and economical to produce but is also as readily adaptable for use with a pinching or nonpinching line snubber as with an axially reciprocable or axially stationary line spool.

What is claimed is:
1. In a spinning reel having a housing, a normally nonrotatable line spool carried on said housing, a carrier adjacent said spool and fixed to a selectively rotatable shaft, an outwardly biased holder mounted on said carrier and slidable between a radially inner and radially outer position and forming with said housing relatively rotatable members, a pickup device actuated by said holder to extend radially outwardly of said carrier when the holder is in outer position and to retract inwardly of said carrier when said holder is in inner position, and a latch mechanism for retaining said holder in said inner position and selectively releasing said holder, said latch mechanism comprising, an elongated substantially radially directed lock pawl having opposed ends, anchor means connecting one of said pawl ends to one of said relatively rotatable members, the other end of said pawl having sear means axially deflectable toward and away from the other of said relative rotatable members, said other member having a concentric locking groove therein with an axially oriented wall, at least one offset in said wall presenting an axially open recess forming a rim, said sear means being received in said groove and abuttingly engaging said axially oriented wall when said holder is in said radially inner position to maintain same in said position, said sear means having a radially oriented, axially directed lip portion extending axially outwardly of and cooperating with said rim to axially deflect said locking pawl and sear means carried thereby from engagement with said groove and recess to thereby release said holder upon relative rotation between said members.

2. In a spinning reel having a housing, a normally nonrotatable line spool carried on said housing, a carrier adjacent said spool and fixed to a selectively rotatable shaft, an outwardly biased holder mounted on said carrier and slidable between a radially inner and radially outer position and forming with said housing relatively rotatable members, a pickup device actuated by said holder to extend radially outwardly of said carrier when the holder is in outer position and to retract inwardly of said carrier when said holder is in inner position, and a latch mechanism for retaining said holder in said inner position and selectively releasing said holder, said latch mechanism comprising, and elongated substantially radially directed lock pawl having opposed ends, anchor means connecting one of said pawl ends to one of said relatively rotatable members, the other end of said pawl having sear means axially deflectable toward the other of said relatively rotatable members, said other member having an annular lock groove with an axially oriented wall terminating in a rim, the end of said sear being received within said lock groove and abuttingly engaging said axially oriented wall to releasably maintain said holder in said inner position, a recess extending radially of said groove into the axially oriented wall of said lock groove, said recess also having an axially oriented wall terminating in a rim which, with the axially oriented wall of said lock groove, provides a continuous surface, said recess having a peripheral dimension sufficient to admit the end of said sear, said sear means having a radially oriented, axially extending lip of sufficient dimension to extend outwardly of and in cooperating relation with the rim of said recess when said lip is received in the recess to engage and axially deflect said locking pawl and sear means carried thereby from engagement with said groove and recess to thereby release said holder upon relative rotation between said members.

3. A spinning reel, as set forth in claim 2, in which the radial extent of said recess is of such minimal dimension that the pickup device is retracted irrespective of whether the sear engages the axial wall along said groove or recess.

References Cited
UNITED STATES PATENTS

| 2,911,165 | 11/1959 | Sarah | 242—84.2 |
| 3,105,650 | 10/1963 | Kuether | 242—84.2 |
| 3,108,762 | 10/1963 | Murvall | 242—84.2 |
| 3,298,630 | 1/1967 | Taggart | 242—84.2 |

BILLY S. TAYLOR, *Primary Examiner.*